Aug. 26, 1952 W. J. FLEETWOOD 2,607,991
ELLIPSOGRAPH
Filed June 13, 1949 2 SHEETS—SHEET 1

INVENTOR.
WILLIAM J. FLEETWOOD
BY
Stedman B. Hoar
AGENT

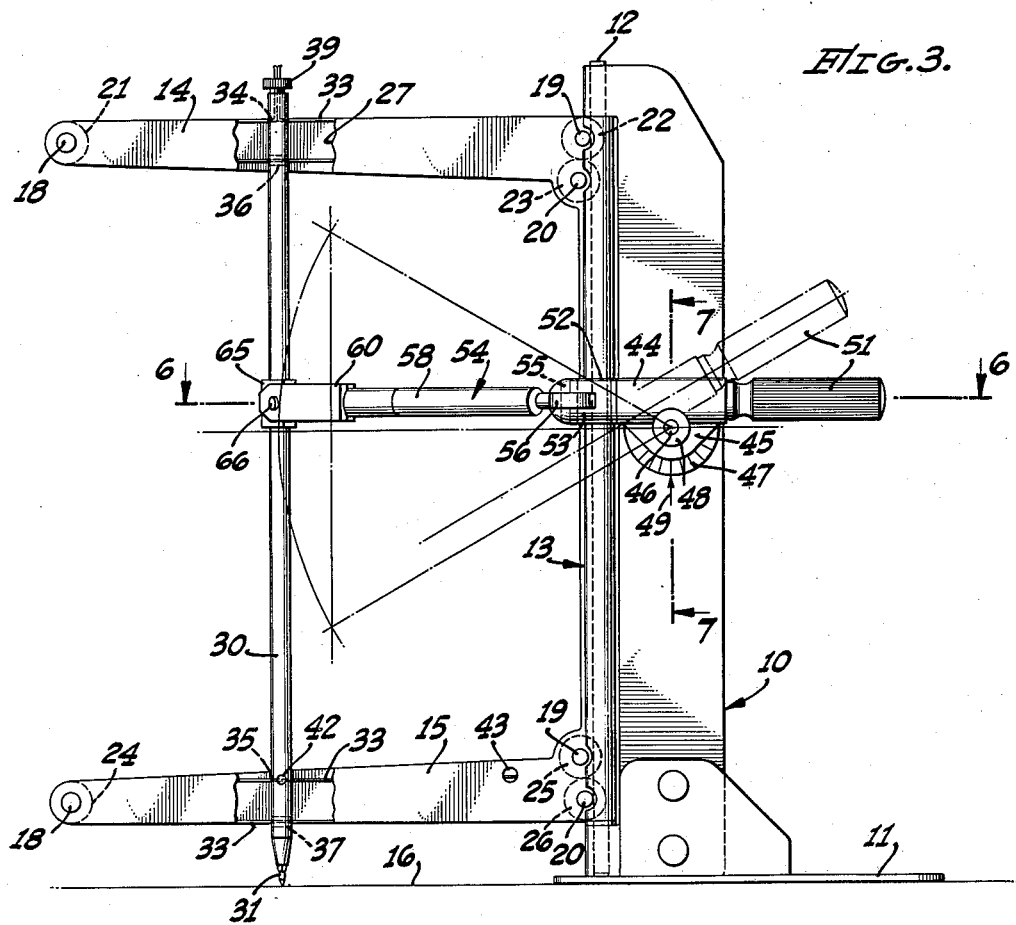
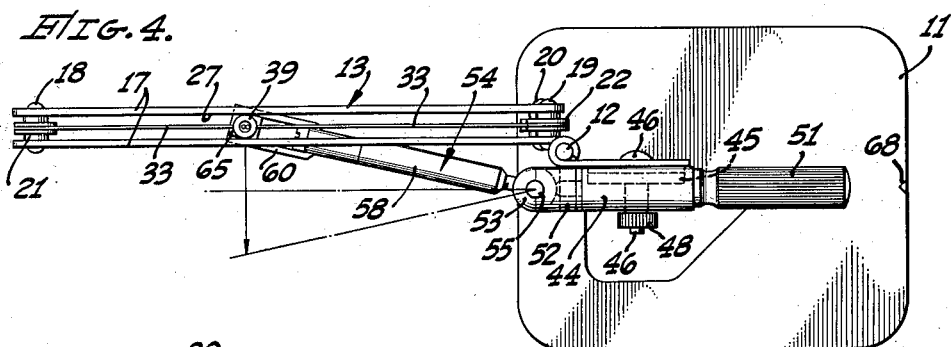
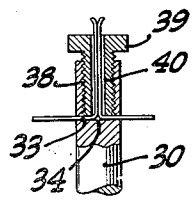

Patented Aug. 26, 1952

2,607,991

UNITED STATES PATENT OFFICE 2,607,991

ELLIPSOGRAPH

William J. Fleetwood, Los Angeles, Calif.

Application June 13, 1949, Serial No. 98,869

2 Claims. (Cl. 33—30)

1

This invention relates to a drafting instrument for drawing ellipses, and has as an object the provision of an instrument of the type generally known as an ellipsograph wherewith ellipses may be accurately drawn to specified dimensions.

A further object of the invention is to provide an ellipsograph which is horizontally compact in relation to the maximum size of ellipse which it is designed to draw, so that the instrument may be conveniently handled on a drawing-board or paper of reasonable size.

Another object of the invention is to provide an ellipsograph which is simple to operate, requiring adjustment of only two elements, governing respectively the major diameter and the minor diameter of the ellipse, and not involving broad knowledge of mathematics on the part of the draftsman.

Still another object of the invention is to provide an ellipsograph capable of drawing a straight line or an ellipse having that line as a major axis and an axial ratio approaching closely to unity.

My invention possesses other objects and advantages which will be specifically pointed out as the following description of a preferred embodiment of the invention proceeds, or will be apparent from consideration of the accompanying drawings, illustrative of that embodiment, in which:

Fig. 3 is a side elevational view on an enlarged scale, the minor axial control being shown in full line in the position of Fig. 1 and in broken line in the position of Fig. 2;

Fig. 4 is a top plan view;

Fig. 5 is a further enlarged detail view of means employed for locking a carrier cable to a movable scriber;

Figure 1:
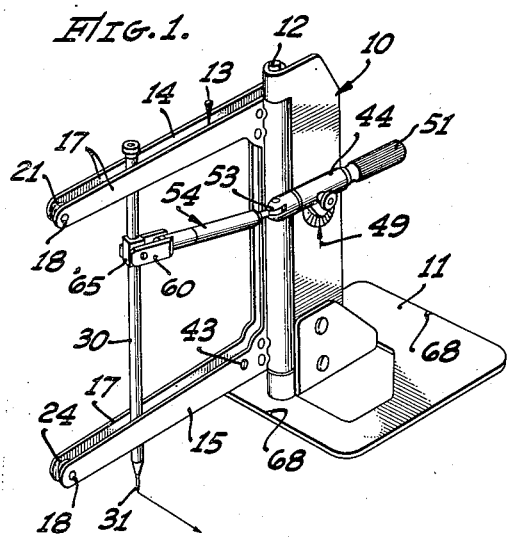
Fig. 1 is a perspective view of an ellipsograph embodying the principles of my invention, the particular adjustment shown therein being that for drawing a straight line.

In general terms, I accomplish the purposes of

2 my invention by mounting a scriber so that it is free to travel in all directions parallel to a paper or other surface to be inscribed, and in contact with the paper, and connecting the scriber, by means of a joint permitting universal movement, to one end of a bent arm or crank, the other end of which is journalled rotatably. Rotation of the journalled end of the crank causes the universal joint at the other end to describe a circle in space, and the scriber must necessarily follow the gyration of the universal joint, nevertheless remaining perpendicular to the paper. By inclining the journal of the crank at a selected angle to the paper, the scriber is caused to inscribe upon the paper a projection of the circle at an angle of projection, or in other words an ellipse. By altering the crank angle, the diameter of the circle in space may be varied, the major diameter of the resultant ellipse being twice the throw of the crank. The three-dimensional movement of the connection between the crank and the scriber permits the entire mechanism to be concentrated in a space not inconvenient to the draftsman and affording full visibility of the figure drawn.

Specifically describing the details of the preferred embodiment of my invention as herewith illustrated, I have shown a frame 10 comprising a base 11 and a hinge post 12 erected thereon and pivotally supporting a two-armed bracket 13. The upper and lower arms, 14 and 15 respectively are parallel, one above the other, and swing in planes parallel to a surface to be inscribed, such as a sheet of paper 16 on which the base 11 may rest. Each of the arms comprises side rails 17 joined at their distal ends by journal pins 18 and at their proximal ends by journal pins 19 and 20, which latter are disposed approximately one above the other. A sheave 21 turns upon the journal pin 18 of the upper arm 14, and sheaves 22 and 23 turn upon the journal pins 19 and 20 of the upper arm. In like manner the journal pins 18, 19, and 20 of the lower arm 15 rotatably support sheaves 24, 25, and 26 respectively. Each of the arms thus defines a slot 27, bounded at the sides by the rails 17 and at the ends by the sheaves respective thereto.

A scriber 30 is mounted in the slots 27 so as to be closely guided therein by the rails 17 in movement between the distal and proximal ends of the arms. The scriber 30 may be any type of instrument suitable for drawing or engraving, such as for example a shaft having a nib or drawing point 31 at its lower end.

A cable 33 supports the scriber 31 perpendicularly to the paper 16, piercing the scriber through narrow holes 34 and 35 adjacent the upper and lower ends of the scriber, in which it is firmly held and through larger holes 36 and 37 (see Fig. 3) in which it runs freely. A preferred method of securing the ends of the cable 33 is shown in Fig. 5. A threaded recess 38 in the upper end of the scriber extends downwardly therein to the level of the hole 34 and receives a plug 39 which has a central bore 40. The ends of the cable 33 are threaded through opposite ends of the hole 34 into the recess 38 and are drawn upwardly through the bore 40 of the plug 39. When the plug 39 is screwed down to the end of the recess 38 it firmly clamps the ends of the cable, which may be easily adjusted for tension by slightly loosening the plug.

The cable 33 extends from its fastening point at the plug 39 outwardly over the end sheave 21, thence inwardly and freely through the hole 36 to the sheave 23, and downwardly and around the sheave 25 and thence outwardly to the hole 35 in the lower end of the scriber. As the cable passes through the hole 35 it is secured therein by a set screw 42. A hole 43 in the arm 15 permits entrance of a tool for adjusting the set-screw 43 when the scriber is moved to alignment with that hole. From its fastening point in the hole 35, the cable extends outwardly around the sheave 24, thence inwardly and freely through the hole 37 and thence around the sheaves 26 and 22 to its fastened termination in the plug 39. By reference to Fig. 3 it will be seen that this construction provides a cable strand at the level of the arm 14 which is movable in the same direction as a cable strand at the level of the arm 15, these like-moving strands being parallel and secured to the scriber 30. A pressure vector upon the scriber 30 parallel to the arms 14 and 15 will cause the scriber to move along the slots 27, but the two ends of the scriber will always be constrained by the cable 33 to move at the same rate of speed, so that the scriber is maintained perpendicular to the arms 14 and 15 and to the paper 16, and is restrained by the cable from movement perpendicular to the surface of the paper.

A sleeve 44 is mounted on a hub 45 pivotable on a trunnion pin 46 on the frame 10 so as to be pivotable in a plane parallel to the axis of the scriber 30. A graduated scale 47 is provided to show the inclination of the sleeve 44 with respect to the base 11 and paper 16. The trunnion pin 46 is threaded to receive a nut 48 by which it may be locked at a selected inclination as indexed by a mark 49. A shaft 50 extends rotatably through the sleeve 44 having a handle 51 on its one end and being threaded into the bight or head 52 of a clevis 53 at its other end. A second shaft or connecting rod 54 is pivoted on the pin 55 of the clevis 53. As the bearing head 56 of the connecting rod 54 is in alignment with the end of the shaft 50, turning the shaft 50 to advance it through the clevis bight 52 will tighten it upon the bearing head 56 and so lock the connecting rod 54 at any selected angle to the shaft 50.

Figure 6:
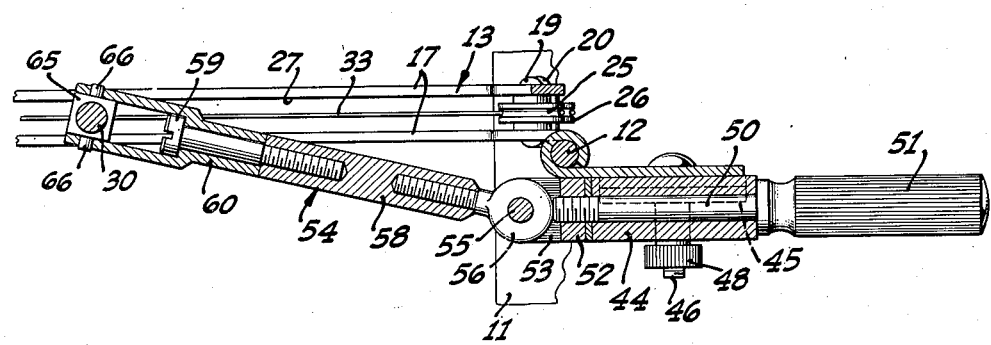
Fig. 6 is a horizontal sectional view on an enlarged scale taken on the plane of section indicated by the line 6—6 of Fig. 3, and looking downward.
Figure 7:
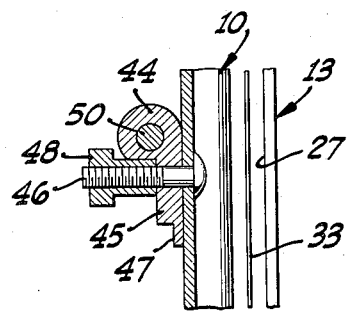
Fig. 7 is a fragmentary vertical sectional view, on approximately the scale of Fig. 6, and taken on the plane of section indicated by the line 7—7 of Fig. 3.

The connecting rod 54 may conveniently be made in three pieces as shown in Fig. 6, comprising a central shaft 58 into one end of which the bearing head 56 is threaded and into the other end of which a swivel head 59 is threaded. A clevis 60 is mounted on the swivel head 59, the swivel head 59 extending through the clevis head and being rotatable in the bight thereof. The shaft 50 and rod 54 obviously form a crank of selectable angularity, of which the elbow, the clevis pin 55, is movable through an arc perpendicular to a surface on which the ellipsograph stands.

A collar 65 is mounted on the scriber 30 and is slidable thereon and rotatable thereabout. Trunnion pins 66 on the sides of the collar 65 are engaged by the arms of the clevis 60. As the clevis 60 can rotate with the collar 65 around the scriber 30 in one plane and can pivot on the trunnion pins 66 in a perpendicular plane and may swivel on the swivel head 59, the collar 65, clevis 60, and swivel head 59 form a universal joint capable of relative rotary motion of its end parts and of angular motion in any direction, and furthermore slidable along the scriber 30.

To draw an ellipse upon the paper 16, the ellipsograph is placed on the paper so that marks 68 on the base 11, aligned with the shaft 50, are aligned with the center of the proposed ellipse. The minor axis of the ellipse will lie in prolongation of the line defined by the marks 68. If the diameters are known, the connecting rod 54 is held in aligned prolongation of the shaft 50, both of which are held parallel to the paper 16, and the connecting rod is then swung in a plane parallel to the paper until the collar 65 and the scriber controlled thereby are moved laterally one-half the length of the major diameter of the ellipse. The scriber will then be stationed at one end of the major diameter. The shaft 50 may then be rotated to advance to a locking position against the bearing head 56 of the connecting rod, the connecting rod being held steady to provide a resistance. With the nut 48 loosened, the minor diameter is obtained by tilting the sleeve 44 and shaft 50. The nut 48 is then tightened. Rotation of the shaft 50 by turning the handle 51 in the direction tending to tighten the lock upon the connecting rod 54 causes the collar 65 to describe a circle in space, during which gyration the collar guides the scriber 30 so that the drawing point 31 inscribes a projection of the circle upon the paper 16. This projection is the desired ellipse. As appears from Fig. 2, this circle in space may lie in a plane inclined to the paper at less than 90 degrees and yet be disposed entirely beyond the zone through which any part of the shaft 50 might be projected upon the paper, thus bringing the ellipse outwardly from the post 12 into a zone of relatively clear visibility and easy access.

If the length of the minor axis is not known, but the angle of projection is known, the required tilting of the shaft 50 may be accomplished by reference of the scale 47 to the index mark 49. The inclination of the circle described by the collar 65 will be complementary to the inclination of the shaft 50, with reference to the paper 16.

Figure 2:
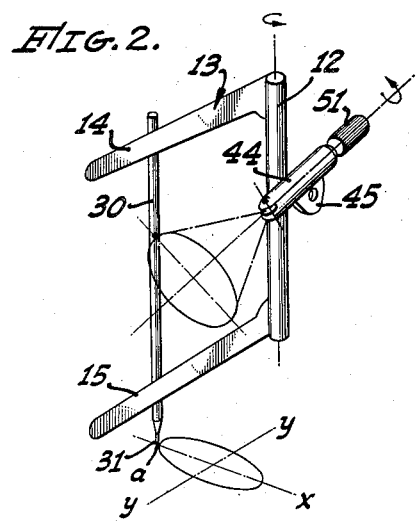
Fig. 2 is a schematic view showing the minor axial control adjusted for drawing an ellipse and illustrating the manner of projecting a circle at a desired axial ratio or angle of projection upon a drafting surface.

It should be noted that rotation of the shaft 50 when the shaft 50 and connecting rod 54 are aligned and not tilted produces no movement of the scriber 30; and that rotation when the shaft and rod are angulated but not tilted produces a straight line on the X axis of Fig. 2. As the tilt of the shaft 50 increases, the axial ratio of the ellipse drawn approaches unity, the ellipse approaching circular form. As herein shown, my invention is not capable of drawing a circle, requiring a vertical position of the shaft 50, but an angle of projection of from twenty to ninety (the straight line) degrees may be achieved for small ellipses.

Obviously my invention is subject to modification in the form and arrangement of its elements;

therefore, I do not wish to be limited to the exemplification herein described and illustrated, the spirit and scope of the invention being expressed in the appended claims.

I claim:

1. A device for drawing ellipses, comprising: a frame; guide means pivoted on said frame for movement parallel to a surface to be inscribed; a scriber carried by said guide means perpendicularly to said surface and having freedom of lateral movement longitudinally of said guide means; a collar slidable on said scriber; laterally extending pins on said collar; a first clevis engaging said pins; a first shaft swivelly joined at its one end to said first clevis; a second shaft; a second clevis threadedly secured to one end of said second shaft and pivotally connected to the other end of said first shaft, threaded advancement of said second shaft in said second clevis into contact with said first shaft serving to lock said shafts in angular relationship; a sleeve for said second shaft, pivotally mounted on said frame; means for securing said sleeve to said frame so as to hold said second shaft at selected inclinations to said surface; and means for rotating said second shaft, whereby said collar is caused to describe a circle determined as to diameter by the angular relationship of said shafts and as to inclination to said surface by the inclination of said second shaft to said surface, and said scriber is caused to move laterally to inscribe a projection of said circle on said surface.

2. A device for drawing ellipses, comprising: a frame; a member pivoted on said frame having a pair of radially extending arms, each of said arms having a longitudinal slot; a scriber held slidably by said arms within said slots; a sheave at the distal end of each of said arms; a pair of sheaves at the proximal end of each of said arms; a cable trained around said distal sheaves and then around said pairs of sheaves so as to provide cable strands movable in like direction and parallel to each other between said distal sheaves and the adjacent pair of sheaves, two of said like-moving strands being secured to said scriber so as to hold said scriber at a fixed angle to said arms while permitting said scriber to move laterally along said slots; a collar slidable on said scriber; a jointed arm connected to said collar to have universal movement with respect thereto; means for securing the distal portion of said jointed arm at selected angles to the proximal portion of said jointed arm; means for securing the proximal portion of said jointed arm at selected inclinations to said frame; and means for rotating said jointed arm.

WILLIAM J. FLEETWOOD.

REFERENCES CITED

The following references are of record in the file of this patent:

UNITED STATES PATENTS

| Number | Name | Date |
|---|---|---|
| 677,590 | Oldfield | July 2, 1901 |
| 828,372 | Becker | Aug. 14, 1906 |
| 2,468,017 | Aichroth | Apr. 26, 1949 |

FOREIGN PATENTS

| Number | Country | Date |
|---|---|---|
| 141,400 | Great Britain | Apr. 12, 1920 |
| 436,830 | Great Britain | Oct. 18, 1935 |
| 143,226 | Austria | Oct. 25, 1935 |